(12) United States Patent
Wellman et al.

(10) Patent No.: US 8,254,018 B2
(45) Date of Patent: Aug. 28, 2012

(54) MONOLITHIC LENS/REFLECTOR OPTICAL COMPONENT

(75) Inventors: William H. Wellman, Santa Barbara, CA (US); Joseph F. Borchard, McKinney, TX (US); Douglas Anderson, Richardson, TX (US)

(73) Assignee: Raytheon Company, Waltham, MA (US)

( * ) Notice: Subject to any disclaimer, the term of this patent is extended or adjusted under 35 U.S.C. 154(b) by 2283 days.

(21) Appl. No.: 10/423,395

(22) Filed: Apr. 25, 2003

(65) Prior Publication Data
US 2004/0212877 A1 Oct. 28, 2004

(51) Int. Cl.
*G02B 5/08* (2006.01)
*G02B 13/14* (2006.01)
(52) U.S. Cl. ........................................ 359/359; 359/356
(58) Field of Classification Search .................. 359/350, 359/355, 356, 359
See application file for complete search history.

(56) References Cited

U.S. PATENT DOCUMENTS

| 4,820,923 | A | | 4/1989 | Wellman |
| 5,793,538 | A | * | 8/1998 | Cameron et al. ............... 359/731 |
| 5,909,308 | A | * | 6/1999 | Ulrich ........................... 359/357 |
| 7,002,154 | B2 | * | 2/2006 | Wellman et al. .............. 250/352 |

FOREIGN PATENT DOCUMENTS

| DE | 31 19 498 | 12/1982 |
| EP | 0 747 744 | 12/1996 |
| JP | 05312638 | 11/1993 |

* cited by examiner

*Primary Examiner* — Lee Fineman
(74) *Attorney, Agent, or Firm* — Christie, Parker & Hale, LLP (57) ABSTRACT

A monolithic body (31) has a compound optical surface that defines a centrally located lens element (31B) that is transmissive to light having wavelengths of interest, such as infrared radiation (IR), and a reflector (31B) disposed about the lens element that is reflective to the light. The monolithic body is comprised of a material selected for fabricating a refractive lens element. The compound optical surface has a centrally located portion defining the lens element surrounded by a generally curved surface region having a reflective coating that defines the reflector. The centrally located portion may be coated with an anti-reflection coating. The compound optical surface is preferably formed in one operation, such as one that uses a diamond point turning operation.

14 Claims, 5 Drawing Sheets

MONOLITHIC LENS/REFLECTOR OPTICAL COMPONENT

TECHNICAL FIELD

This invention relates generally to optical element assemblies used for detecting infrared radiation (IR) and, more specifically, relates to optical element assemblies that are suitable for use in wide-angle, compact optical assemblies.

BACKGROUND

Infrared detector-based surveillance sensors ideally exhibit an extremely wide angular coverage, an ultra-compact size and high sensitivity and high image quality over the entire field-of-view (FOV). Typical applications include, but are not limited to, missile warning systems (MWS) and infrared search and track (IRST) systems. Another application of interest includes day/night area surveillance cameras that use optically-based wide-angle coverage, as opposed to mechanical scanning, for compactness and ruggedness.

Conventional wide-angle lens systems are typically used with dewar and coldshield technology. Due to the often-required small size of the IR sensor device itself, the use of re-imaging optics is generally precluded for many applications, resulting in the presence of only a single aperture stop or pupil for the entire optical system. In practice, the aperture stop is a "coldstop" located within the dewar to maintain infrared sensitivity. However, the resultant optical asymmetry complicates the lens design, thereby limiting image quality and image illumination. Further, if high image quality is maintained then a small physical size is difficult to achieve. In addition, the need for aberration corrections results in more stringent manufacturing tolerances, which increases cost.

Figure 1:
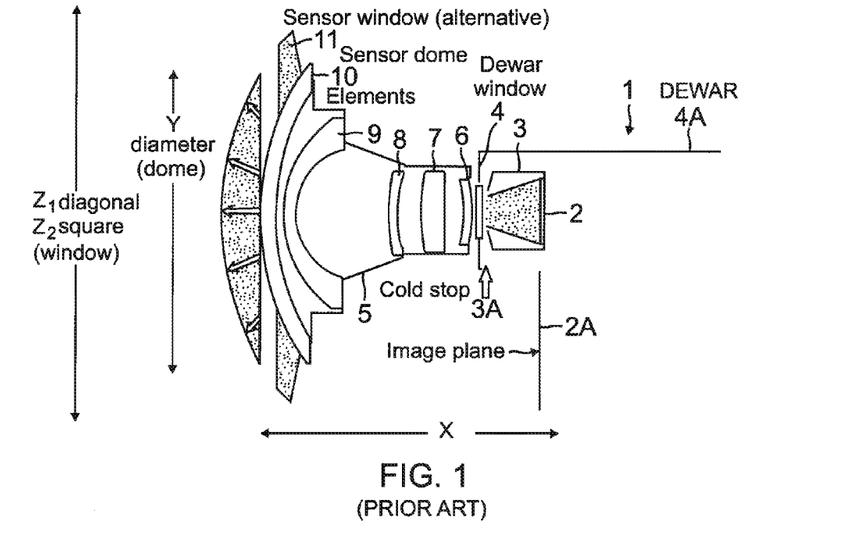
FIG. 1 is a cross-sectional view of a first embodiment of a prior art wide-angle IR sensor.

One example of a conventional wide-angle IR sensor 1 is shown in FIG. 1. The sensor 1 includes an IR detector 2 located at an image plane 2A. The IR detector 2 is located within a coldshield 3 having an opening that defines a coldstop 3A. A dewar window 4 of a dewar housing 4A, also referred to herein simply as the dewar 4A, separates the coldstop 3A from uncooled optical components 5 that include a multi-element (four elements in this case) lens comprised of lens elements 6, 7, 8 and 9. A protective sensor dome 10 or window 11 defines the entrance to the IR sensor 1. Representative dimensions (inches) for a f:2.0 lens with 150 diagonal field-of-view coverage are: x=1.9, y=1.9 and z=2.6. The IR detector 2 can be said to be a "staring" type of detector, as the IR arriving from the scene is not scanned across the radiation-responsive surface of the detector 2.

In this embodiment the coldstop 3A is located at the true coldshield 3, which lies within the dewar 3. Designed for compactness, the distance from the focal plane 3A to the dome 10 exterior surface is only 1.9 inches. The window 11 may be employed if the sensor depth were increased, and if the sensor opening were increased to 2.6 inches (clear aperture diagonal) to accommodate the outward spread of the imaging rays with distance from the coldstop 3A.

This conventional design can be said to be optically asymmetric. This can be seen if one were to consider, by analogy, the aperture stop (coldstop 3A) as the fulcrum or pivot point of a beam having at one end the image plane 2A, and at the other end the front surface of the sensor dome 10. As can be appreciated, if the optical system where symmetric then the aperture stop would be located between lens elements 8 and 7, i.e., mid-way between the image plane 2A and the front surface of the sensor dome 10.

Figure 2:
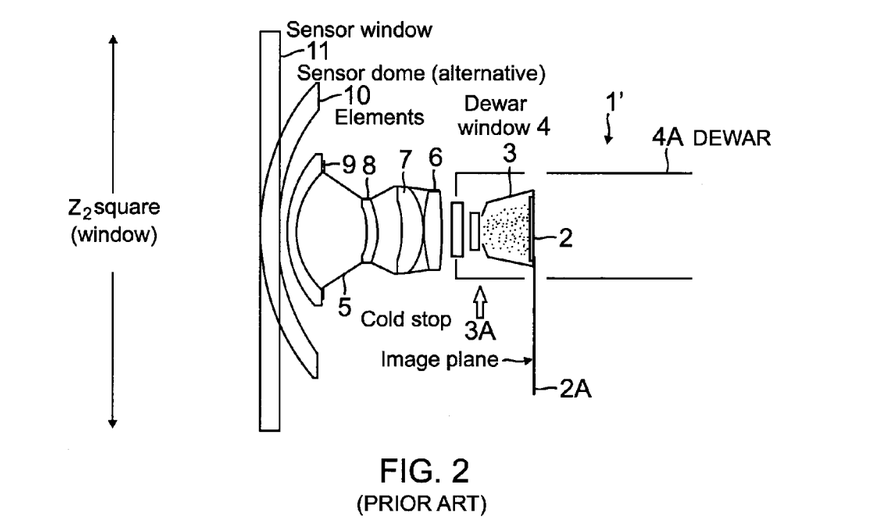
FIG. 2 is a cross-sectional view of a second embodiment of a prior art wide-angle IR sensor.

A second prior art sensor 1' is shown in FIG. 2. The lens achieves a similar small size, and also uses a single stop 3A in the coldshield 3. Although designed for use with a flat window 11, a low-power dome 10 could be used instead (as in the FIG. 1 sensor), to reduce the aperture size of the sensor housing. Representative dimensions (inches) for an approximate 120° field-of-view are: x=1.7 and y=2.4. This lens produces a highly distorted image mapping that requires extensive electronic compensation. Otherwise, the performance and size are similar to that of the FIG. 1 lens.

Figure 3A:
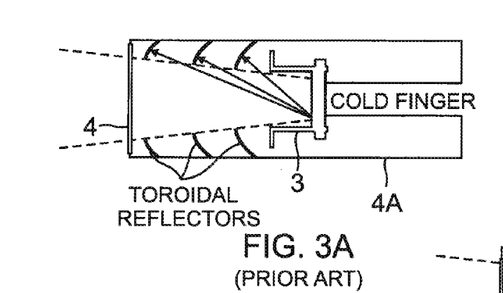
Figure 3B:
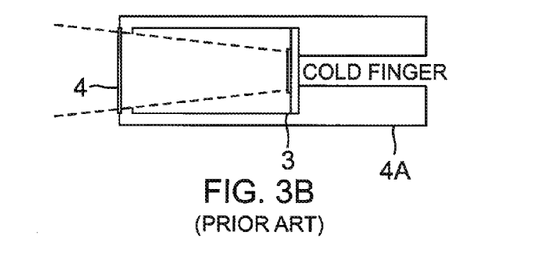
FIG. 3B shows a conventional coldshield design that is prior art to the IR sensor of FIG. 3A.

A third prior art design is shown in FIG. 3A, and reflects the sensor shown in the now commonly-assigned U.S. Pat. No. 4,820,923, "Uncooled Reflective Shield for Cryogenically-Cooled Radiation Detectors", by William H. Wellman. A virtual coldshield, or "warmshield", is used to avoid the large size of the coldshield 3 of the conventional design (FIG. 3B). One problem solved by the invention disclosed in U.S. Pat. No. 4,820,923 was the presence of the large thermal mass and cantilevered weight of the conventional coldshield 3. The problem is solved by the use of the multiple toroidal reflectors, enabling the coldshield mass and length to be reduced. One significant advantage of the warm shield design of FIG. 3A is that the cryogenically cooled cold shield 3 can be made smaller, and can require less cooling, than the conventional cold shield 3 design of FIG. 3B.

It is noted that in FIG. 4 of U.S. Pat. No. 4,820,923 an optical element 30 is shown disposed between toroidal segments 26b and 26c (see column 6, lines 31-57). In the conventional approach typified by U.S. Pat. No. 4,820,923 the optical element 30 and the reflector segments 26b and 26c are all separate components that are each required to be mounted and aligned within the imaging system. As may be appreciated, this can increase cost and decrease reliability. A need thus exists to provide an improved optical element/reflector segment assembly. Prior to this invention, this need was not adequately addressed.

SUMMARY OF THE PREFERRED EMBODIMENTS

The foregoing and other problems are overcome, and other advantages are realized, in accordance with the presently preferred embodiments of these teachings.

A monolithic body has a compound optical surface that defines a centrally located lens element that is transmissive to light having wavelengths of interest, such as infrared radiation (IR), and a reflector disposed about said lens element that is reflective to the light. The monolithic body is comprised of a material selected for fabricating a refractive lens element. The compound optical surface has a centrally located portion defining the lens element surrounded by a generally curved surface region having a reflective coating that defines the reflector. The centrally located portion may be coated with an anti-reflection coating. The compound optical surface is preferably formed in one operation, such as one that uses a diamond point turning operation.

In an exemplary and non-limiting embodiment, the monolithic body is mounted within an IR imaging system having an entrance aperture for admitting IR from a scene. The imaging system includes a dewar containing a coldshield that encloses a cooled IR detector disposed at an image plane. The dewar has a dewar window, and an optical axis of the IR imaging system passing through the dewar window and the image plane. A plurality of uncooled optical elements are disposed along the optical axis between the entrance aperture and the dewar window; and a plurality of generally annular reflector segments are disposed around the optical axis between the dewar window and the entrance aperture. Each of the reflector segments has a reflective surface facing the dewar window. An opening through an outermost reflector segment furthest from the dewar window defines an effective cooled aperture stop of the IR imaging system.

The monolithic body having the compound surface that defines the lens element that is transmissive to IR, as well as the reflector disposed about the lens element, are mounted so as to be disposed between the effective cooled aperture stop and said dewar window.

Also disclosed is a method to fabricate an optical element. The method includes (a) providing a blank comprised of a material to that is transmissive to light having wavelengths of interest; and (b) processing the blank to form a monolithic body having a compound optical surface defining a centrally located lens element that is transmissive to the light and a reflector disposed about said lens element that is reflective to light.

Processing the blank includes, in the preferred embodiment, using a diamond point turning operation to form the compound optical surface, and also includes depositing a reflective coating on material that surrounds the lens element. An anti-reflection coating can also be applied over the lens element.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 3A is a cross-sectional view of a prior art IR sensor that includes a plurality of warmshields, while

DETAILED DESCRIPTION OF THE PREFERRED EMBODIMENTS

Figure 6A:
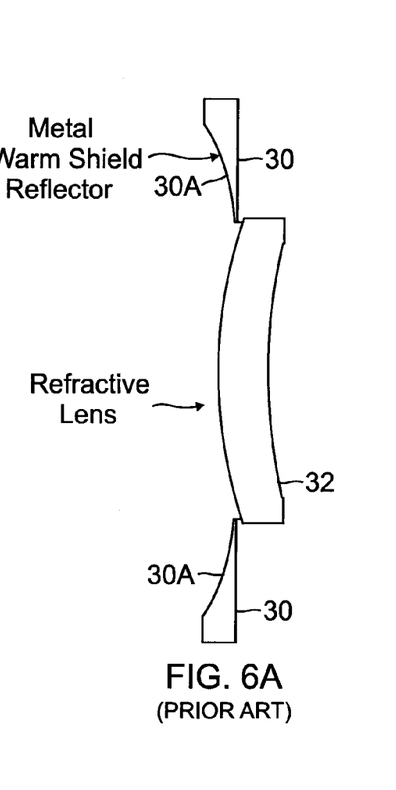
FIG. 6A is a cross-sectional view of a prior art metal warmshield and refractive lens combination.

The prior art reflective warmshield reflectors, typified by those shown in the above-referenced U.S. Pat. No. 4,820,923, are typically made from metal. FIG. 6A shows a prior art warm shield reflector 30. The optically reflective portion of the warm shield reflector 30 is polished, either conventionally with a polishing slurry, or by a Diamond Point Turning (DPT) operation. A highly reflective evaporated coating 30A is then applied to the surface that provides the high reflectance in the IR waveband. The warm shield reflector 30 is mounted into the optical system in a manner similar to a refractive lens element 32.

Figure 6B:
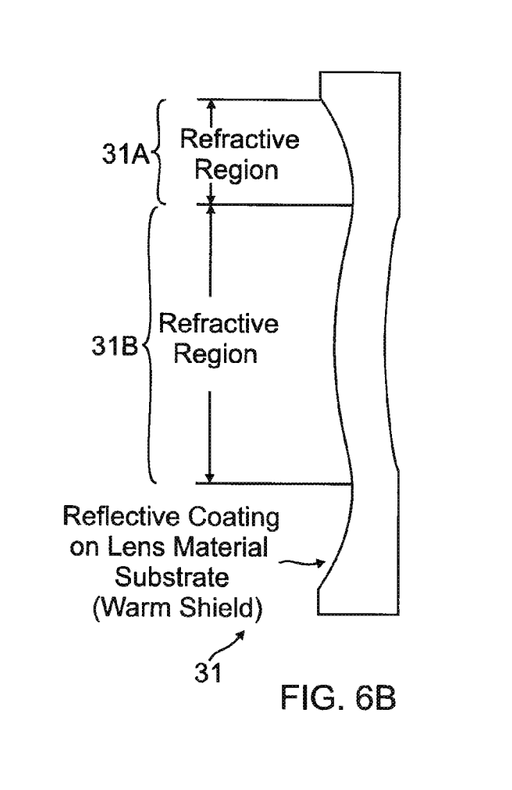
FIG. 6B is a cross-sectional view of an integrated, monolithic warmshield/lens assembly in accordance with an embodiment of this invention.
Figure 7:
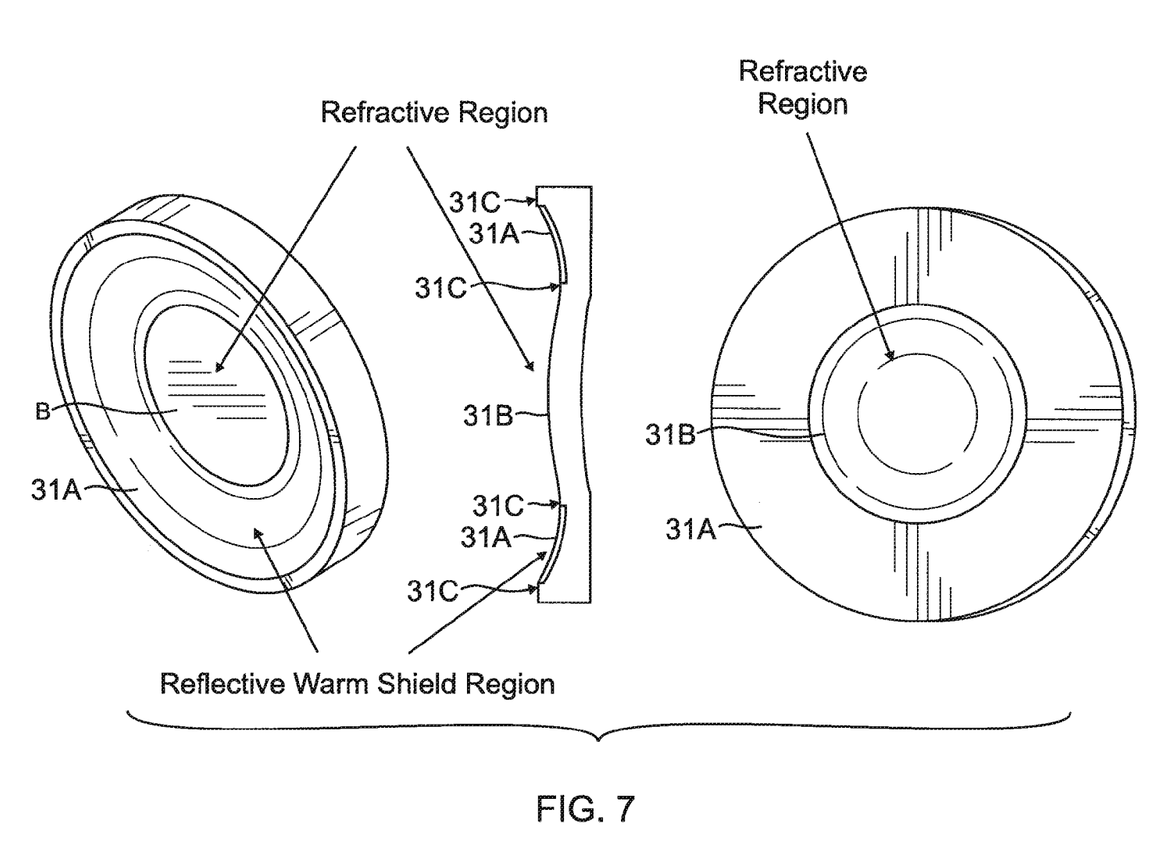
FIG. 7 shows an exemplary elevational, side and frontal view of the warmshield/lens assembly of FIG. 6B.

FIG. 6B is a cross-sectional view of an integrated, monolithic lens/reflector element 31 in accordance with an embodiment of this invention, while FIG. 7 shows an exemplary elevational, side and frontal view of the lens/reflector element 31. In this embodiment the conventional separate lens 32 and the warm shield reflector 30 itself are combined into the one optical element comprised of the integrated and monolithic warmshield reflector and lens element 31. The lens/reflector element 31 includes a central refractive region 31B that performs as the refractive lens 32 of FIG. 6A, preferably using the same optical surface curvatures and center thickness. The lens/reflector element 31 also includes an outer region 31A with a reflective surface that functions as the metal warm shield 30 of FIG. 6A. The desired surface curvatures of the refractive and reflective regions 31B, 31A, respectively, are combined into a single compound optical surface.

Figure 4:
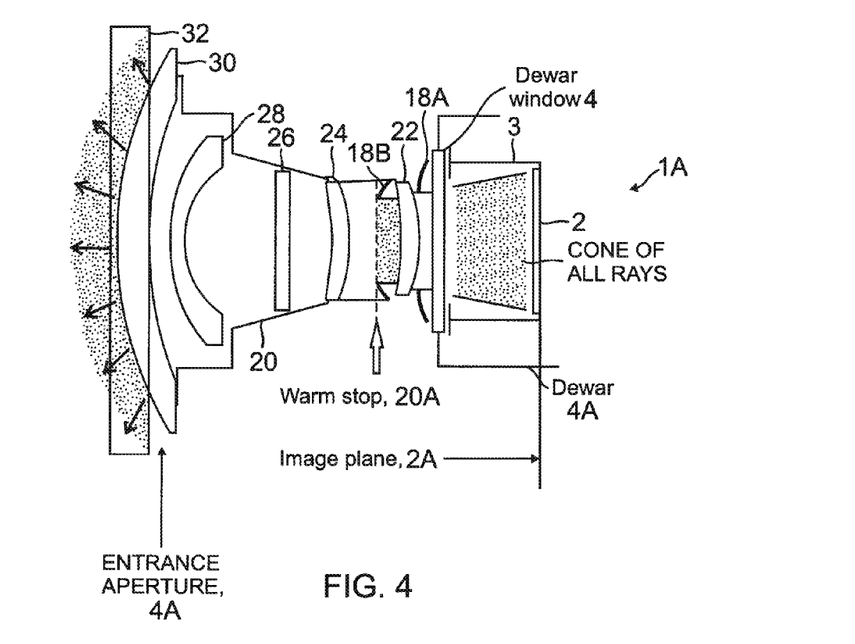
FIG. 4 is a cross-sectional view of an improved wide-angle IR sensor.

The monolithic lens/reflector element 31 can be used in place of a warmshield segment 18A and a lens 22, as shown in FIG. 4 and described below, although in other embodiments it may be used at other locations, as well as in other types of optical systems.

In a preferred, but non-limiting embodiment of this invention the material that forms the compound optical surface is silicon, which is used in the lens prescription of the refractive part of the lens design 31B. However, any optical material can be used that is appropriate for the refractive part of the lens system, and that can be processed, such as by DPT and coating, to provide the smooth reflective portion 31A.

As was noted, Diamond Point Turning (DPT) is the preferred method of fabricating the compound optical surface. After providing a blank of the desired optical material, such as silicon, the refractive and reflective regions 31B, 31A are preferably fabricated in one operation, which reduces cost as compared to fabrication of the two separate elements 30 and 32 of the prior art design shown in FIG. 6A.

In addition, this embodiment has a more significant cost saving because of the compactness of the design at the location of the warm shield. Due to the limited space allowed, the warm shield reflector 30 is typically required to be thin, and is difficult to fabricate. An additional cost savings results from having to mount only the one monolithic lens/reflector 31, as compared to the separate two elements 30 and 32 in the conventional design shown in FIG. 6A.

A further advantage is derived from the fact that since the compound surface of the lens/reflector element 31 can be Diamond Point Turned in the same operation, the centering, tilt, and positioning of the reflective surface 31A relative to the refractive surface 31B is extremely accurate. In contradistinction, the two-element prior art design of FIG. 6A can experience an accumulation of errors caused by separate fabrication of the individual elements, separate mounting surfaces in the housing, and the two mounting steps during assembly.

In a preferred embodiment an antireflection (AR) coating is deposited on both sides of at least the lens portion 31B using evaporative deposition with an optical vacuum chamber. A reflective coating, such as gold, silver, aluminum, or any suitable coating material, is then deposited on the reflector portion 31A of the compound surface. The refractive central region 31B of the lens is preferably masked during the deposition of the reflective coating. A photo-mask and subsequent lift-off method is a presently preferred method of masking the refractive region 31B.

It should be noted that the reflective portion 31A exhibits less scatter from the aperture of the reflector, as compared to the prior art warmshield 30. At the thin edge of the aperture of the metal in the prior art warmshield 30, there must be some minimum thickness to assure mechanical stability. However, the resulting metal edge is a source of scatter that can result in the generation of stray radiation. In this invention, the warmshield is actually the reflective thin film on the refractive material of the lens, so there is very little scatter from the edge of the reflective aperture. While it is possible that some stray radiation may be caused by a misalignment of the reflective coating aperture edge to the transition point of the compound surface (indicated by the arrows 31C in FIG. 7), it is more straightforward to achieve a precision alignment with state of the art photomasking techniques and DPT, than it is to achieve a knife-edge metal reflector in the prior art warm shield 30.

The lens portion 31B can have any suitable shape, and can be concave or convex. The reflector portion 31A can also be given any desired shape, generally a curved shape, and can define a toroidal surface, as described below, or a spherical surface, or an elliptical surface as just three examples.

The monolithic lens/reflector element 31 can be used with light of any desired wavelength, including visible, ultraviolet and IR. The material from which the monolithic lens/reflector element 31 is fabricated is selected to be compatible with the wavelengths of the light that will pass through the lens portion 31B. For example, the material can be a glass, or silicon, or germanium, or any suitable UV-transmissive material.

Mounting of the monolithic lens/reflector element 31 can be by any suitable mounting technique used for mounting lenses, such as by the use of ring-type spacers and/or registered steps or ledges formed in the surrounding optical assembly.

Having thus described a presently preferred embodiment of the monolithic lens/reflector element 31, an example of one suitable type of optical system that can employ the monolithic lens/reflector element 31 will now be provided. This example is not, however, to be construed in a limiting sense upon the use or practice of this invention.

Before describing the exemplary embodiment of the optical system, a brief discussion will be made of optical stops in general, and more specifically of optical stops in IR imaging systems. This discussion will provide the reader with a better appreciation of the benefits provided this invention.

In every lens, there are physical apertures that limit the passage of energy to the image. Each lens element has a limited clear aperture, as do baffles in the lens and other structure in the sensor. One of these apertures will most limit the diameter of the cone of energy that the lens can pass to the image. This aperture is termed the "aperture stop", and its size determines the irradiance at the image. Another aperture typically limits the angular extent of the image, and this aperture is termed the "field stop". Apertures also are used to block stray radiation from reflecting off of lens mounts and structure and onto the image, and these are generally termed "baffles".

The placement of an optical stop is important to system performance. Infrared sensors require the stop to be "cold", since it is thermal energy that is being detected. This is unlike visible sensors, which require only that the stop be "black", i.e., non-transmissive, non-reflective and non-radiative in the visible spectrum. Infrared stops, like infrared detectors, must be cooled to cryogenic temperatures. This means that the stop is formed by a "coldshield" structure that is mounted with the detector, atop the cold focal plane. These cold elements must be sealed from the atmosphere, to block condensation or frosting due to humidity, as well as to lessen warming due to convective heat transfer. Typically, a vacuum "dewar" is used to enable cooling to cryogenic temperatures where gas liquefication, as well as water frosting, occurs.

It is impractical to enclose lens elements of an infrared system within the cryogenic detector package or dewar. If mounted on the cold structure, the added mass of the lens elements impedes cooldown time, delaying sensor readiness. Also, the added mass would require stiffening supporting structures in the dewar, which contradicts their purpose of providing thermal isolation. Manufacturing tolerances require the lens elements to be held in one mount assembly, not mounted partially inside and partially outside the dewar. Mounting of the entire lens assembly in the dewar makes it inaccessible and difficult to focus, and also compromises the vacuum integrity.

For any optical system, placement of the aperture stop affects imaging performance. Symmetries about the optical stop help maintain image quality at larger off-axis angles, which is very important in wide-angle optical systems. Insofar as sensor physical size allows, symmetries can be introduced by relaying the stop somewhat symmetrically about the lens. For example, a true stop located near the image plane can be imaged (as a pupil) on the front window of the sensor, at the same time that the optical system images the scene on the image plane. However, ultra-compact sensors cannot tolerate the physical size of such optical systems, and thus have only the aperture stop. With prior-art optics, using a true coldshield as the stop, the stop is located very asymmetrically within the optical system. Indeed, it must be closer to the image plane than the last lens element, with enough space between that element to accommodate the dewar window and necessary assembly tolerances.

FIG. 4 illustrates an improved IR imaging system 1A, preferably but not necessarily a wide-angle IR imaging system, that has an entrance aperture 40 for admitting IR from a scene of interest. In the IR sensor 1A the aperture stop is placed within a multi-element lens, comprised of lenses 22, 24, 26 and 28 contained within optical assembly or housing 20, while still providing proper coldshield operation. A sensor dome 30 or a flat window 32 is located at the entrance (entrance aperture) to the sensor 1A. The lens elements 22, 24, 26 and 28, and the dome 30 or flat window 32 are comprised of suitable IR transmissive materials, such as germanium or silicon.

The coldshield, required for the desired optical effect, is created optically, instead of physically, by the use of shaped, preferably toroidal or substantially toroidal, mirror elements or reflectors 18A and 18B. Each of the reflector segments 18A, 18B thus has a generally annular reflective surface facing the dewar window 4, where the reflective surface surrounds an IR transmission path region through the reflector segment. The IR transmission path region may be an opening made through the reflector segment, or it can comprise a transmissive optical element in accordance with the presently preferred embodiment of the monolithic lens/reflector element 31 shown in FIGS. 6B and 7.

In the design of the sensor 1A attention is paid to the precise image formation of the optical coldshield at the desired aperture stop location, just as one must design with care the image formation of the scene at the desired focal plane 2A location. Such optical coldshields, or "warmshields", are best created with toroidal reflectors 18A and 18B that avoid re-imaging the IR detector 2 upon itself, thus avoiding the formation of unwanted "ghost" images.

Figure 5:
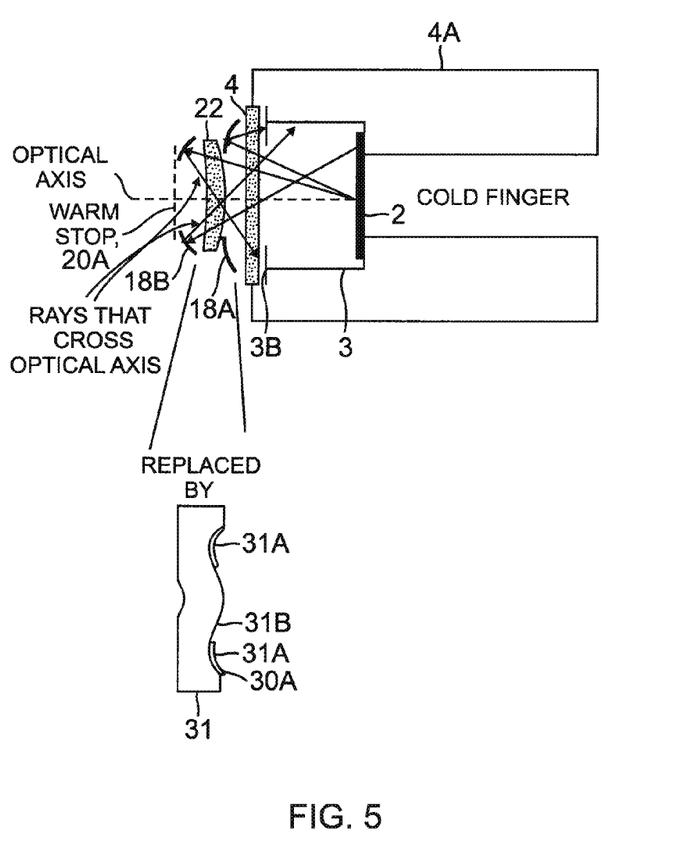
FIG. 5 is a diagram illustrating ray reflections from a focal plane to the warmshield of FIG. 4.

The warmshield is constructed with the shaped mirror elements 18A and 18B that face the cold focal plane 2A. As is best seen in FIG. 5, the mirror elements 18A and 18B create an equivalent coldshield by imaging a cold surface of the coldshield 3. The coldstop, or warmstop 20A, is placed within the multi-element lens, and is made to appear cold by action of the reflector elements 18A and 18B. The warmstop 20A is defined by the aperture through the outermost (relative to the image plane 2A) mirror element 18B, which is smaller than the aperture through the innermost mirror element 18A, and thus defines the aperture stop of the sensor 1A, as was discussed above.

In the embodiment of FIG. 4, and referring also to FIG. 5, the physical coldshield 3 within the dewar 4A lies close to the image plane 2A, and has a darkened forward face 3B that "fills" the virtual coldshield that is formed by the reflectors 18A and 18B. At least two reflectors 18A and 18B are used in order to capture all non-imaging rays that pass through the physical coldshield 3, without enlarging the optics significantly. One, two or more reflectors can be used in this invention. In the embodiment of FIG. 4 the outermost reflector 18B defines the aperture stop 20A, while the innermost reflector 18A and coldshield opening within the outer face 3B of the coldshield 3 are made large enough to avoid vignetting any imaging rays. The opening within the forward face 3B of the coldshield 3 is also designed to block as many out-of-field rays as possible. In this embodiment the out-of field rays are captured by the true coldshield 3, either directly (as is usual) or indirectly by reflection. These principles are more clearly illustrated in FIG. 5, where it can be seen that the multiple toroidal reflectors 18A and 18B serve to reduce the size of the warmshield. Reflection across the optical axis avoids self-blockage by the segmented reflector structure, and reflection downward from the innermost reflector segment 18A reduces window ray angles, thereby improving transmission. Between the reflectors 18A and 18B is one of the lens elements (22 in this case) of the optical system. It should be noted that this invention is not limited to placing only a single lens element within the reflectors, nor is it limited to the use of only two reflectors.

In accordance with this invention the reflector 18A and the lens element 22 are combined into the single monolithic lens/reflector element 31 shown in FIGS. 6B and 7.

The reflecting surfaces of the reflectors 18A and 18B, or 31A and 18B, preferably have a generally toroidal shape, and are used to image each point on the detector array 2 onto the cold surface surrounding the detector array 2A. This cold surface is the outer face 3B of the physical coldshield 3 within the dewar 4A. However, this feature may be omitted if warmshield-reflected rays are intercepted by some other cold or absorptive surface, such as the interior of the coldshield 3. The outer face 3B of the coldshield 3 is preferably made optically "black", i.e., absorptive in the spectral region of interest. The toroidal reflectors 18A and 18B are designed to prevent reflections from the detector array 2 from mapping back onto the detector array 2, and thereby reduce the generation of ghost images. The use of spherical reflectors is avoided, as they suffer from ghost image problems simply because reflections from the detector array 2 would be mapped back onto the detector array. Instead, a proper toroid design maps the detector array 2 onto the coldshield face 3B, for all ray angles that contribute to the image. Rays at more extreme angles, outside the cone of all rays shown in FIG. 4, may be safely mapped onto the detector array 2, for they originate only from cold objects within the coldshield 3 itself.

As is discussed in the above-referenced commonly-assigned U.S. Pat. No. 4,820,923, "Uncooled Reflective Shield for Cryogenically-Cooled Radiation Detectors", by William H. Wellman, incorporated by reference herein in its entirety, a toroid focuses the rays radially, which reduces the coldshield size. However, the toroid also disperses the rays circumferentially, which reduces sensitivity to imperfections in the warmshield optical train. This defocus effect reduces sensitivities to dust on the surface of the dewar window 4, to imperfections in the window 4 and coldshield 3 surface coatings, and to thermal gradients in the coldshield 3, even if the true coldshield lies near the window 4. Without the circumferential defocusing, the sensor 1A may be vulnerable to extraneous patterns on the focal plane 2A, causing "ghost" images of these artifacts.

As employed herein, a wide-angle or wide field-of-view IR sensor is one having a FOV of about 30 degrees or greater. By example, the IR sensor 1A is may be designed to have a FOV of 150 degrees.

As was shown in FIG. 5, one of the reflectors 18, specifically the reflector 18A, or 31A in the embodiment that uses the preferred monolithic lens/reflector element 31, is oriented such that rays do not cross the optical axis when reflected upon the coldshield outer face 3B. This is desirable, since having all reflected rays cross the optical axis in a wide-angle sensor would result in large angles of incidence that would impair dewar window 4 transmission and coldshield 3 absorptance, and would also foreshorten the coldshield 3 radial width, thereby complicating the reflector optical design with more stringent imaging requirements. In addition, the aperture sizes and focal lengths are sufficiently small that lens diameters are less critical than for conventional telephoto systems. Moreover, ray angles are so large that off-axis absorption and reflectance effects are a greater concern than for telephoto systems.

The foregoing description has provided by way of exemplary and non-limiting examples a full and informative description of the best method and apparatus presently contemplated for carrying out the invention. However, various modifications and adaptations may become apparent to those skilled in the relevant arts in view of the foregoing description, when read in conjunction with the accompanying drawings and the appended claims. As but some examples, the use of other similar or equivalent lens materials, lens prescriptions, lens sizes and spacings, wavelength ranges, numbers of lens elements and/or reflectors having various shapes, including spherical and elliptical, may be attempted by those skilled in the art. However, all such and similar modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A monolithic body having a compound optical surface defining a centrally located lens element that is transmissive to light and a reflector disposed about said lens element that is reflective to light, said monolithic body being mounted within an imaging system having an entrance aperture for admitting infrared radiation (IR) from a scene, the imaging system comprising a dewar that encloses a cooled IR detector disposed at an image plane, where said dewar comprises a dewar window and where said monolithic body is mounted between an aperture stop of said imaging system and said dewar window.

2. A monolithic body as in claim 1, where said monolithic body is comprised of a material selected for fabricating a refractive lens element, said compound optical surface comprising a centrally located portion defining said lens element surrounded by a curved surface region having a reflective coating that defines said reflector.

3. A monolithic body as in claim 2, where said centrally located portion is coated with an anti-reflection coating.

4. A monolithic body as in claim 1, where said compound optical surface is formed using a diamond point turning operation.

5. A monolithic body as in claim 1, further comprising means for mounting said body within an imaging system having an entrance aperture for admitting light from a scene.

6. A monolithic body having a compound optical surface defining a centrally located refractive lens element that is transmissive to infrared radiation (IR) and a reflector disposed about said lens element that is reflective to IR, further comprising means for mounting said monolithic body within an IR imaging system having an entrance aperture for admitting IR from a scene, the imaging system comprising a dewar containing a coldshield that encloses a cooled IR detector disposed at an image plane, said dewar comprising a dewer window, an optical axis of said IR imaging system passing through said dewar window and said image plane; at least one uncooled optical element disposed along said optical axis between said entrance aperture and said dower window; and a plurality of generally annular reflector segments disposed around said optical axis between said dewar window and said entrance aperture, each of said reflector segments having a reflective surface facing said dewar window, where an opening through an outermost reflector segment furthest from said dewar window defines an effective cooled aperture stop of said IR imaging system, and where said lens element that is transmissive to IR and said reflector disposed about said lens element are mounted so as to be disposed between said effective cooled aperture stop and said dewar window.

7. A monolithic body as in claim 6, where said monolithic body is comprised of a material selected for fabricating a refractive lens element, said compound optical surface comprising a centrally located convex portion defining said lens element surrounded by a generally toroidal surface region having a reflective coating that defines said reflector.

8. A monolithic body as in claim 7, where said centrally located convex portion is coated with an anti-reflection coating.

9. A monolithic body as in claim 6, where said compound optical surface is formed using a diamond point turning operation.

10. A method to fabricate an optical element, comprising:
providing a blank comprised of a material to that is transmissive to light having wavelengths of interest;
processing the blank to form a monolithic body having a compound optical surface defining a centrally located lens element that is transmissive to the light and a reflector disposed about said lens element that is reflective to light; and
subsequently mounting said optical element within an imaging system having an entrance aperture for admitting infrared radiation (IR) from a scene, the imaging system comprising a dewar that encloses a cooled IR detector disposed at an image plane, where said dewar comprises a dewar window and where said optical element is mounted so as to be between an aperture stop of the imaging system and the dewar window.

11. A method as in claim 10, where processing comprises depositing a reflective coating on material that surrounds said lens element.

12. A method as in claim 11, where said blank is comprised of a material selected for fabricating a refractive lens element, and where said compound optical surface comprises said centrally located portion defining said lens element surrounded by a curved surface region having said reflective coating that defines said reflector.

13. A method as in claim 10, further comprising applying an anti-reflection coating over said lens element.

14. A method as in claim 10, where processing comprises using a diamond point turning operation to form said compound optical surface.

* * * * *